United States Patent [19]

Brandner et al.

[11] 4,396,070

[45] Aug. 2, 1983

[54] PIVOTAL DISC GANG SECTION

[76] Inventors: Harley Brandner, P.O. Box 881; James D. Bettenhausen, P.O. Box 750, both of Wishek, N. Dak. 58495

[21] Appl. No.: 281,713

[22] Filed: Jul. 9, 1981

[51] Int. Cl.³ .................. A01B 61/04; A01B 21/08
[52] U.S. Cl. ................................ 172/572; 172/710
[58] Field of Search ............ 172/572, 710, 570, 178, 172/570, 573

[56] References Cited

U.S. PATENT DOCUMENTS

| | | | |
|---|---|---|---|
| 636,342 | 11/1899 | Lambert | 172/572 |
| 856,033 | 6/1907 | Crisler | 172/572 |
| 1,220,449 | 3/1917 | Patterson | 172/572 X |
| 3,536,146 | 10/1970 | Groenke | 172/710 |
| 4,066,132 | 1/1978 | Rehn | 172/572 |
| 4,333,535 | 6/1982 | Hentrich | 172/572 |

FOREIGN PATENT DOCUMENTS

| | | | |
|---|---|---|---|
| 1120 | of 1926 | Australia | 172/572 |
| 12278 | 2/1977 | Australia | 172/572 |

OTHER PUBLICATIONS

Binkley Wilbeck—Advertizing Brochure of the Binkley Co., Warrenton, Mo.

*Primary Examiner*—Richard J. Johnson
*Attorney, Agent, or Firm*—Harvey B. Jacobson

[57] ABSTRACT

A disc gang section comprising a plurality of rotatable disc blades which are pivotally mounted as a unit to the horizontal upper gang tube of the disc frame so as to travel in an arc toward the rear of the disc implement when one or more of the blades of the disc gang strikes a solid object. Ground pressure of the blades is controlled by a helical coil spring or springs located above the upper gang tube. The helical spring encircles a tension link which extends from a pivot pin which pivotally mounts the disc gang section to the upper gang tube of the disc frame. A spring abutment is rigidly mounted to the upper gang tube so as to divide the spring from the pivot pin and allow the disc gang section to pivot away from the upper gang tube upon hitting an obstruction and properly align the disc blades once the obstruction has been cleared by the blades and the spring biases the blades to the normal working position.

7 Claims, 2 Drawing Figures

PIVOTAL DISC GANG SECTION

BACKGROUND OF THE INVENTION

1. Field of the Invention

This invention relates generally to improvements in agricultural implements and more particularly to spring-biased disc gang section for use with disc implements of either tandem or offset design.

The prior art disc constructions have exclusively mounted the rotating blades to the disc frame in a rigid manner. Therefore, when an individual disc blade strikes a solid object, such as a large rock or the like, the rigidly mounted disc blade will not yield and thus will become damaged. Often times, the components of the disc machinery are damaged as well. In accordance with the present invention, the disc blades are spring-biased and pivotally mounted as a unit onto the disc frame so as to enable the discs to yield upon one or more discs striking an object and return to the normal working position once the object has been passed without the excessive damage which has plagued disc machinery since the beginning of the time such machinery has been used for working the soil.

2. Disclosure Statement

It has been known to provide soil-conditioning implements with mountings which permit the implements to pass over obstructions, such as rocks, without damage to the implements or surrounding component parts of the machinery. U.S. Pat. No. 3,451,489, issued June 24, 1969, to Sullivan, mentions that prior art spring-loaded rolling coulter constructions were known, but had not been entirely successful, since the prior art devices generally employed helical compression springs to normally bias the rolling coulter into a ground-working position. The patentee states that the employment of helical compression springs is not desirable since the springs must be of fairly large size to have the desired initial preload and that the relatively large size causes trash to build up upon the coulter assembly. The Sullivan patent replaced the helical compression springs of the prior art with Belleville washers. U.S. Pat. No. 3,700,037, issued Oct. 24, 1972, to Hentrich et al, also attempted to improve the spring-biasing of coulters on moldboard plows and, in particular, attempted to improve upon the structure patented by Sullivan mentioned above. Hentrich et al discloses an improved cushion mounting for coulters which can use either spring cushions or hydraulic cushions. In each of the above-mentioned patents, the cushion means for the coulters are situated in the proximity of the rolling coulter and it is understandable that Sullivan would be concerned about the build up of trash on the coulter assembly affecting the operation of the assembly. As will be more fully described, in the present invention the springs are positioned above the disc frame and are spaced at a considerable distance from the rotating discs and soil. Another important difference between prior art spring-loaded rolling coulters and the present invention concerns the fact that in each of the coulters the springs are associated with the individual rolling coulters, while in the present invention, a disc section comprising a plurality of blades is spring-biased as a unit such that upon any one of the rotating blades of the section striking an object, the entire section is pivoted to pass over obstructions which may be encountered.

The concept of utilizing spring-biasing of soil-treating implements in order to cushion the force between the implement and the ground are not limited to rolling coulters, but have been disclosed for use in plows as disclosed in U.S. Pat. Nos. 3,202,223, issued Aug. 24, 1965, to Fulton, 3,606,928, issued Sept. 21, 1971, to Quanbeck and 3,782,481, issued Jan. 1, 1974, also to Quanbeck. Again, each of these patents disclose the addition of springs onto each plow and not to a section of individual plows. Spring biasing the blades of a disc has heretofore been unknown.

SUMMARY OF THE INVENTION

In accordance with the present invention, an entire disc gang section comprising a plurality of rotating disc blades is pivotally mounted as a unit to the disc frame so that all of the blades of the disc gang will pass over an obstruction encountered by one or more of the blades of the disc section. The individual disc gang sections are spring-biased so as to apply the proper amount of load onto the disc blades during the operation of the disc implement when the rotating disc blades are in the normal working position and to compensate for all of the abnormal ground forces acting against the disc implement during contact with an obstruction. The location of the spring and pivot points of the disc gang section relative to the implement frame enable the desirable operation of the disc implement in which the disc gang sections are arranged in either a tandem or offset configuration.

Accordingly, a primary object of the present invention is to provide a disc implement in which the rotating disc blades are able to pass over obstructions, such as rocks, without damage to the disc blades or to other components of the implement and which are sufficiently biased to be maintained in the normal working position when normal ground conditions are encountered.

Another object of the present invention is to provided an improved disc implement which contains a pivotal attachment such that a group of disc blades as a unit will pass over an abnormal obstruction when one or more of the blades encounter the obstruction, thereby preventing damage of the blades and other components of the implement and maintaining the disc blade bearings in alignment with the center of the blades to extend bearing life.

Still another object of the invention is to spring-bias a disc gang section comprising a plurality of rotating discs into the normal working position when normal ground is encountered and to compensate for any ground forces acting against the implement, such as during contact with an abnormal obstruction wherein the spring is positioned so as to be free of any ground or trash build up.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Briefly, a disc is an implement which has a number of rotating disc blades mounted in a row in spaced relation to each other and at an angle to the center line of the direction in which the disc implement is drawn. The disc blades are preferably mounted in a plurality of disc gang sections which are placed in a tandem arrangement in which the disc gang sections are in line with each other or in an offset arrangement in which the individual disc gang sections are staggered. A disc implement is utilized to condition the soil immediately preceding planting and often times, a planter will be attached to the rear of the disc implement.

Figure 1:
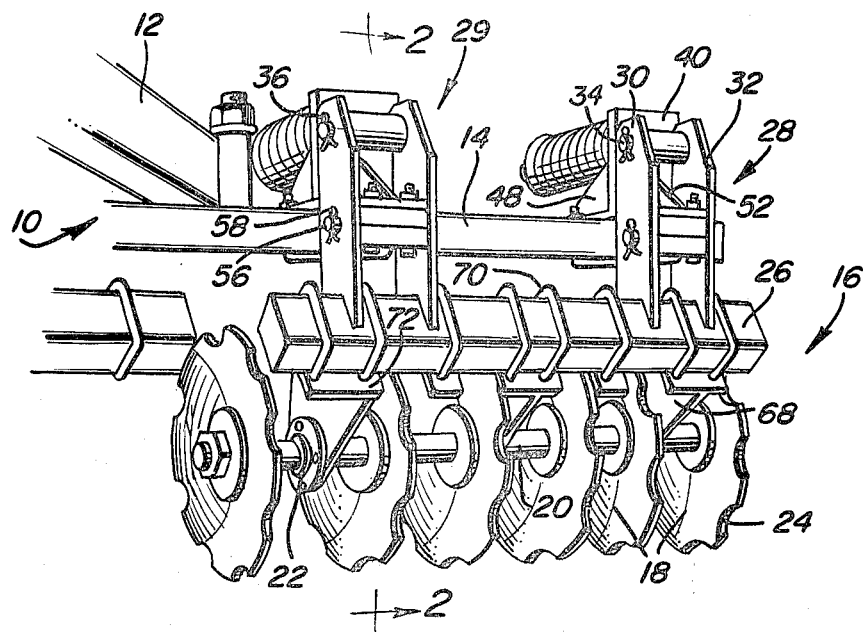
FIG. 1 is a fragmentary perspective view of a disc frame illustrating the placement of the disc gang section at an angle relative to the center line of the direction of movement of the disc implement.

In FIG. 1, the disc implement of the present invention is generally indicated by reference numeral 10 and includes a horizontal disc frame 12 substantially parallel to the direction of movement of the implement and which supports a horizontal upper gang tube 14 placed at an angle from the transverse perpendicular to frame 12. Upper gang tube 14 extends laterally from frame 12 and supports a plurality of disc gang sections such as disc gang section 16 which comprises a plurality of spaced rotating disc blades 18 placed in a row along axle 20 which rotates through a plurality of bearings 22. Individual disc blades 18 are circular in shape and may or may not include a plurality of spaced cavities 24 approximately several inches in length positioned about the circumference. Any number of disc blades 18 can be included in an individual disc gang section depending upon the size of the disc implement.

Figure 2:
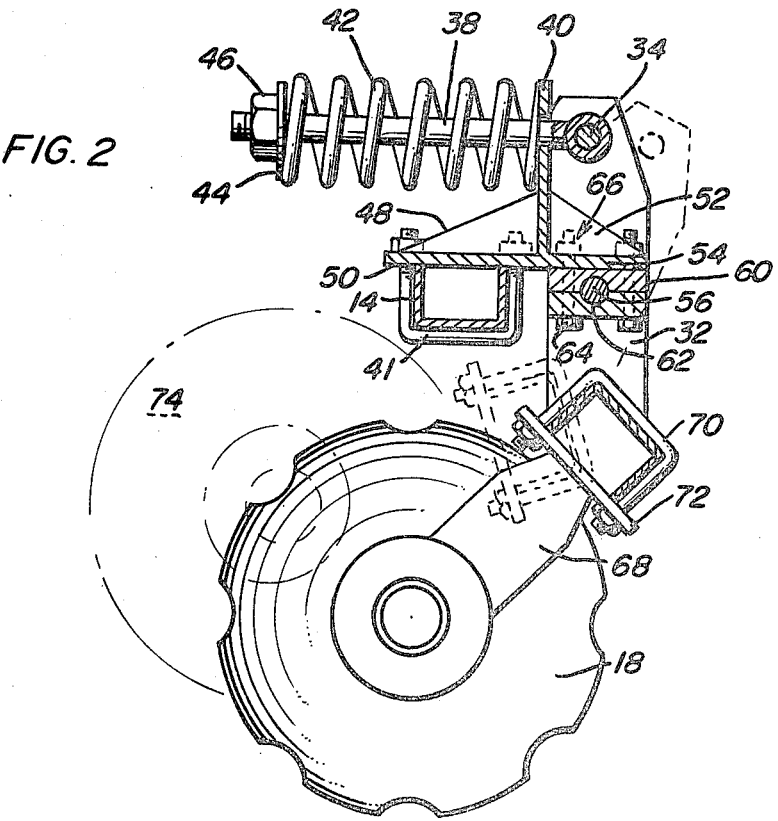
FIG. 2 is a transverse sectional view of the disc gang section illustrated in FIG. 1 and taken generally along the line 2—2 of FIG. 1.

Referring also to FIG. 2, the pivotal attachment of disc gang section 16 to upper gang tube 14 can now be described. Disc gang section 16 comprises a horizontally transverse extending lower gang tube 26 which has welded thereto a pair of spaced mounting blocks 28 and 29 which are positioned adjacent to opposite ends of lower disc gang tube 26. Each mounting block 28 and 29 is formed by a pair of spaced, parallel mounting plates 30 and 32 which are welded to lower gang tube 26 and extend upward and perpendicular to the longitudinal plane of lower gang tube 26 and extend above upper gang tube 14. Positioned and extending through each of mounting plates 30 and 32 at the top portion thereof above upper gang tube 14 is pivot pin 34 held in place by means of cotter pin 36. Tension link 38 either integrally fabricated with pivot pin 34 or welded thereto, extends from the center of pin 34 toward the rear of disc implement 10 to form a T-connection. An upwardly extending spring abutment plate 40 is secured to upper gang tube 14 by means of a pair of U-bolts 41 and extends from the top surface of upper gang tube 14 upwardly to the top surface of mounting plates 30 and 32 which abut against the forward face of spring abutment 40. Spring abutment 40 includes an aperture (not shown) through which tension link 38 rearwardly extends. Coil spring 42 encircles tension link 38 and abuts at its forward end spring abutment 40 and is retained on tension link 38 by spring retainer washer 44 which is maintained on tension link 38 by means of nut 46.

Spring abutment 40 is reinforced by a pair of rearwardly extending gussets 48 which are welded to spring abutment 40 and rearwardly extending U-bolt support plate 50. Further reinforcement of spring abutment 40 is provided by center gusset 52 which is welded to the forward face of spring abutment 40 and to the forward lateral plate 54 integral with U-bolt support plate 50. Positioned and extending through each of mounting plates 30 and 32 is a second pivot pin 56 held in place by cotter pin 58. Pivot pin 56 is positioned about the midpoint of the length of mounting plates 30 and 32. Pivot pin 56 is supported by a pair of bearing plates 60 and 62 which are positioned within the space between mounting plates 30 and 32. Each bearing plate 60 and 62 includes opposed half round grooves to accommodate pivot pin 56. Plates 60 and 62 are secured together and to gusset support plate 54 by means of four bolts 64 which are retained by four nut and washer assemblies 66.

The individual bearing standards 68 are mounted to lower gang tube 26 by means of U-bolts 70 which are secured to bolt supporting plates 72 of bearing standards 68. Accordingly, it can be seen that mounting brackets 30 and 32 are interconnectedly associated through lower gang tube 26 to axle 20 which supports the plurality of rotating disc blades 18.

Spring 42, acting through tension link 38 via spring retaining washer 44 normally retains mounting plates 30 and 32 in a rearward position against the forward face of spring abutment 40 which also acts as a stop means and thus retains bearing standards 68 and thus rotating disc blades 18 in a lowered, normal working position. However, should any one of rotating disc plates 18 of disc gang section 16 encounter an obstruction, spring 42 will yield and permit mounting plates 30 and 32 to pivot about pivot pin 56 and allow each disc blade 18 of disc gang section 16 to deflect as a unit in an arc to the rear and upward as indicated by disc blade 74 shown in phantom in FIG. 2. As can be determined, once an obstruction is encountered, the whole disc gang section 16 pivots as a unit upon pivot pin 56. Mounting plates 30 and 32 move in arc downwardly and forward of disc implement 10 as shown in phantom in FIG. 2 and retaining washer 44 is pulled against spring 42 due to pivot pin 34 which allows tension link 38 to be aligned with the aperture in abutment 40. Helical spring 42 is compressed as tension link 38 is drawn forward by the pivoting mounting plates 30 and 32 and lower gang tube 26 and attached bearing standards 68 pivot disc blades 18 in the manner illustrated in phantom. Once the obstruction has been passed, spring 42 again urges mounting plates 30 and 32 into the normal position abutted against the forward face of spring abutment 40 and thus rotating disc plates 18 are again placed in the normal working position.

While FIG. 1 illustrates a disc implement 10 which includes two mounting blocks per each disc gang section 16, the number of mounting blocks may vary depending upon the size of the disc implement and/or disc gang section. Similarly, each disc gang section 16 may incorporate any number of rotating disc blades 18 although six to eight disc blades per disc gang section appears to operate effectively. Because the plurality of rotating disc blades deflect as a unit upon striking an obstruction, all of the bearings are maintained in alignment with the center of the blades resulting in extended bearing life. Furthermore, the springs placed above upper gang tube 14 provides enough distance between the springs and the soil being conditioned to effectively eliminate any soil or trash from accumulating between the coils and thus the coils remain in effective working order.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A disc implement including an upper gang tube, stationary upwardly projecting abutment plate means projecting upwardly from and extending along said upper gang tube, a pair of upstanding mounting plates projecting above and below said upper gang tube, pivot means pivotally supporting said mounting plates relative to said gang tube and abutment plate means for oscillation about an axis stationary relative to and extending along said upper gang tube, the upper ends of said mounting plates being disposed forward of said abutment plate means and rearwardly abuttingly engageable therewith to define limits of rearward swinging of said mounting plates, a lower gang tube supported from the lower ends of said mounting plates and generally paralleling said upper gang tube, depending bearing supports carried by said lower gang tube and journalling a support shaft from the lower ends thereof with said support shaft generally paralleling said lower gang tube, a plurality of disc blades supported from and spaced along said support shaft, horizontal rearwardly projecting tension link means pivotally anchored to said mounting plates at their forward ends and extending rearwardly through the plane of said abutment plate means, said tension link means including rear end abutment means supported therefrom, and coiled compression spring means disposed about said tension link means between said abutment means and said abutment plate means.

2. A disc implement for conditioning the soil comprising: a plurality of rotatable, circular disc blades, substantially uniformly spaced along a common axis, biasing means to retain each of said blades in a lowered normal working position and means to pivot said plurality of disc blades as a unit to an upward position during contact of one or more of said blades with an abnormal obstruction, said biasing means comprising a coil spring, each of said plurality of disc blades being connected to a horizontally positioned lower gang tube, said lower gang tube being interconnected with said pivot means, a horizontally disposed upper gang tube positioned above said lower gang tube, said upper gang tube being connected with said lower gang tube by means of a mounting block, said pivot means including a pivot pin passing through said mounting block, said mounting block being biased by said helical spring, said helical spring being positioned above said upper gang tube, said mounting block comprising a pair of horizontally spaced vertical mounting plates extending from said lower gang tube to a height above said upper gang tube, said pivot pin extending through each of said mounting plates, said implement further including a horizontally disposed tension link pivotally attached to said mounting block, said helical spring encircling said tension link, and spring abutment means attached to said upper gang tube and contacting one end of said spring, spring retaining means attached to said tension link and urged against the other end of said spring, said spring holding said mounting plates against the surface of said spring abutment means opposite the surface contacting said spring so as to retain said plurality of rotating discs in the lowered normal working position.

3. A disc implement for conditioning the soil comprising: a plurality of rotatable, circular disc blades, substantially uniformly spaced along a common axis, biasing means to retain each of said blades in a lowered normal working position and means to pivot said plurality of disc blades as a unit to an upward position during contact of one or more of said blades with an abnormal obstruction, each of said disc blades being connected to a laterally disposed lower gang tube, said biasing means including a plurality of biasing means laterally spaced and associated with said tube, said pivot means including a plurality of laterally spaced pivot means associated with said tube, a laterally disposed upper gang tube, each of said pivot means comprising a vertically positioned mounting means, said mounting means comprising a pair of laterally spaced vertical plates extending from the surface of said lower gang tube to a position above said upper gang tube, each of said pivot means includes a pivot pin extending through said mounting plates, said pivot pin being encased within a pivot pin support block attached to said upper gang tube, said biasing means being associated with said support block, said pivot pin being positioned between said lower gang tube and said biasing means, said biasing means being pivotally mounted to said support block, said mounting plates being positioned forward of said upper gang tube and said biasing means is a coil spring extending rearwardly of said mounting plates, said implement including a spring abutment plate interdisposed between one end of said spring and said mounting plates, whereby said spring abutment plate acts as a stop for said mounting plates when said rotating discs are biased into the normal working position.

4. The implement of claim 3, wherein said biasing means comprises a plurality of laterally spaced biasing means and said pivot pin comprises a plurality of laterally spaced pivot pins.

5. The implement of claim 3 including axle means associated with each of said discs to allow rotation of said discs, and means to connect the axle means associated with each of said discs to said lower gang tube.

6. The implement of claim 5, wherein said plurality of rotating disc blades are supported on a single axle, said axle being supported for rotation by a plurality of bearings, said means to connect said axle to said lower gang tube comprising a plurality of bearing standards containing said bearings, said bearing standards being secured to said lower gang tube by means of U-bolts.

7. The implement of claim 3, wherein said plurality of disc blades are aligned at a positive angle from a perpendicular to the longitudinal direction of movement of said implement.

* * * * *